United States Patent
Bloch et al.

(10) Patent No.: US 9,530,454 B2
(45) Date of Patent: Dec. 27, 2016

(54) SYSTEMS AND METHODS FOR REAL-TIME PIXEL SWITCHING

(71) Applicant: JBF Interlude 2009 LTD—Israel, Tel Aviv-Yafo (IL)

(72) Inventors: Jonathan Bloch, Brooklyn, NY (US); Barak Feldman, Tenafly, NJ (US); Tal Zubalsky, Brooklyn, NY (US); Yuval Hofshy, Kfar Saba (IL); Patrick Griffith, Summit, NJ (US)

(73) Assignee: JBF Interlude 2009 LTD (IL)

( * ) Notice: Subject to any disclaimer, the term of this patent is extended or adjusted under 35 U.S.C. 154(b) by 146 days.

(21) Appl. No.: 14/335,381

(22) Filed: Jul. 18, 2014

(65) Prior Publication Data
US 2015/0104155 A1   Apr. 16, 2015

Related U.S. Application Data

(60) Provisional application No. 61/889,304, filed on Oct. 10, 2013.

(51) Int. Cl.
*G11B 27/00*  (2006.01)
*H04N 5/93*  (2006.01)
(Continued)

(52) U.S. Cl.
CPC ............. *G11B 27/036* (2013.01); *G11B 27/10* (2013.01); *H04N 21/4307* (2013.01);
(Continued)

(58) Field of Classification Search
CPC .................. H04N 21/4728; H04N 21/4316
(Continued)

(56) References Cited

U.S. PATENT DOCUMENTS 5,568,602 A   10/1996   Callahan et al.
5,607,356 A   3/1997   Schwartz
(Continued)

FOREIGN PATENT DOCUMENTS

DE   10053720 A1   4/2002
EP   1033157 A2   9/2000
(Continued)

OTHER PUBLICATIONS

An ffmpeg and SDL Tutorial, "Tutorial 05: Synching Video," Retrieved from internet on Mar. 15, 2013: <http://dranger.com/ffmpeg/tutorial05.html> (4 pages).
(Continued)

*Primary Examiner* — Hung Dang
*Assistant Examiner* — Girumsew Wendmagegn
(74) *Attorney, Agent, or Firm* — Goodwin Procter LLP

(57) ABSTRACT

Systems and accompanying methods are provided for real-time pixel switching in video. A video having first and second portions is provided and is presented to a user, with the first video portion being initially visible to the user and the second video portion not initially visible to the user. During presentation of the video, a user interaction with the first video portion is received, and a selected region of the second video portion is identified based thereon, where the selected region defines a subset of pixels from the second video portion. The selected region is then overlaid on the first video portion, and playback of the second video portion and the first video portion is synchronized.

26 Claims, 7 Drawing Sheets

(51) Int. Cl.
  *G11B 27/036* (2006.01)
  *G11B 27/10* (2006.01)
  *H04N 21/431* (2011.01)
  *H04N 21/43* (2011.01)
  *H04N 21/472* (2011.01)
  *H04N 21/4725* (2011.01)
  *H04N 21/4728* (2011.01)

(52) U.S. Cl.
  CPC ..... *H04N 21/4316* (2013.01); *H04N 21/4725* (2013.01); *H04N 21/4728* (2013.01); *H04N 21/47205* (2013.01)

(58) Field of Classification Search
  USPC ........................................................ 386/282
  See application file for complete search history.

(56) References Cited

U.S. PATENT DOCUMENTS

| | | |
|---|---|---|
| 5,636,036 A | 6/1997 | Ashbey |
| 5,734,862 A | 3/1998 | Kulas |
| 5,818,435 A | 10/1998 | Kozuka et al. |
| 6,122,668 A | 9/2000 | Teng et al. |
| 6,128,712 A | 10/2000 | Hunt et al. |
| 6,191,780 B1 | 2/2001 | Martin et al. |
| 6,222,925 B1 | 4/2001 | Shiels et al. |
| 6,298,482 B1 | 10/2001 | Seidman et al. |
| 6,728,477 B1 | 4/2004 | Watkins |
| 6,801,947 B1 | 10/2004 | Li |
| 7,155,676 B2 | 12/2006 | Land et al. |
| 7,310,784 B1 | 12/2007 | Gottlieb et al. |
| 7,379,653 B2 | 5/2008 | Yap et al. |
| 7,444,069 B1 | 10/2008 | Bernsley |
| 7,627,605 B1 | 12/2009 | Lamere et al. |
| 7,917,505 B2 | 3/2011 | van Gent et al. |
| 8,065,710 B2 | 11/2011 | Malik |
| 8,190,001 B2 | 5/2012 | Bernsley |
| 8,276,058 B2 | 9/2012 | Gottlieb et al. |
| 8,281,355 B1 | 10/2012 | Weaver et al. |
| 8,600,220 B2 | 12/2013 | Bloch et al. |
| 8,650,489 B1 | 2/2014 | Baum et al. |
| 8,860,882 B2 | 10/2014 | Bloch et al. |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,190,110 B2 | 11/2015 | Bloch |
| 9,257,148 B2 | 2/2016 | Bloch et al. |
| 9,271,015 B2 | 2/2016 | Bloch et al. |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0177914 A1 | 11/2002 | Chase |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0138948 A1 | 7/2004 | Loomis |
| 2004/0172476 A1 | 9/2004 | Chapweske |
| 2005/0019015 A1* | 1/2005 | Ackley .................. G11B 27/10 386/201 |
| 2005/0055377 A1 | 3/2005 | Dorey et al. |
| 2005/0091597 A1 | 4/2005 | Ackley |
| 2005/0102707 A1 | 5/2005 | Schnitman |
| 2006/0028951 A1 | 2/2006 | Tozun et al. |
| 2006/0064733 A1 | 3/2006 | Norton et al. |
| 2006/0150072 A1 | 7/2006 | Salvucci |
| 2006/0155400 A1 | 7/2006 | Loomis |
| 2006/0200842 A1 | 9/2006 | Chapman et al. |
| 2006/0224260 A1 | 10/2006 | Hicken et al. |
| 2007/0024706 A1* | 2/2007 | Brannon ............ H04N 7/17318 348/142 |
| 2007/0033633 A1 | 2/2007 | Andrews et al. |
| 2007/0118801 A1 | 5/2007 | Harshbarger et al. |
| 2007/0157261 A1 | 7/2007 | Steelberg et al. |
| 2007/0162395 A1 | 7/2007 | Ben-Yaacov et al. |
| 2007/0239754 A1 | 10/2007 | Schnitman |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0148152 A1 | 6/2008 | Blinnikka et al. |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0024923 A1 | 1/2009 | Hartwig et al. |
| 2009/0055880 A1 | 2/2009 | Batteram et al. |
| 2009/0063681 A1 | 3/2009 | Ramakrishnan et al. |
| 2009/0116817 A1 | 5/2009 | Kim et al. |
| 2009/0199697 A1 | 8/2009 | Lehtiniemi et al. |
| 2009/0228572 A1 | 9/2009 | Wall et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0077290 A1 | 3/2010 | Pueyo |
| 2010/0146145 A1 | 6/2010 | Tippin et al. |
| 2010/0153512 A1 | 6/2010 | Balassanian et al. |
| 2010/0161792 A1 | 6/2010 | Palm et al. |
| 2010/0167816 A1 | 7/2010 | Perlman et al. |
| 2010/0186579 A1 | 7/2010 | Schnitman |
| 2010/0262336 A1 | 10/2010 | Rivas et al. |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1 | 11/2010 | Bloch |
| 2010/0332404 A1 | 12/2010 | Valin |
| 2011/0007797 A1 | 1/2011 | Palmer et al. |
| 2011/0010742 A1 | 1/2011 | White |
| 2011/0026898 A1 | 2/2011 | Lussier et al. |
| 2011/0096225 A1 | 4/2011 | Candelore |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0191684 A1 | 8/2011 | Greenberg |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2012/0005287 A1 | 1/2012 | Gadel et al. |
| 2012/0094768 A1 | 4/2012 | McCaddon et al. |
| 2012/0110620 A1 | 5/2012 | Kilar et al. |
| 2012/0198412 A1 | 8/2012 | Creighton et al. |
| 2012/0308206 A1 | 12/2012 | Kulas |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0259442 A1 | 10/2013 | Bloch et al. |
| 2013/0282917 A1 | 10/2013 | Reznik et al. |
| 2014/0040280 A1 | 2/2014 | Slaney et al. |
| 2014/0078397 A1 | 3/2014 | Bloch et al. |
| 2014/0082666 A1 | 3/2014 | Bloch et al. |
| 2014/0129618 A1 | 5/2014 | Panje et al. |
| 2014/0178051 A1 | 6/2014 | Bloch et al. |
| 2014/0270680 A1 | 9/2014 | Bloch et al. |
| 2014/0282013 A1 | 9/2014 | Amijee |
| 2014/0380167 A1 | 12/2014 | Bloch et al. |
| 2015/0067723 A1 | 3/2015 | Bloch et al. |
| 2015/0104155 A1 | 4/2015 | Bloch et al. |
| 2015/0179224 A1 | 6/2015 | Bloch et al. |
| 2015/0181301 A1 | 6/2015 | Bloch et al. |
| 2015/0199116 A1 | 7/2015 | Bloch et al. |

(56) References Cited

U.S. PATENT DOCUMENTS

2015/0293675 A1 10/2015 Bloch et al.
2015/0294685 A1 10/2015 Bloch et al.

FOREIGN PATENT DOCUMENTS

| EP | 2104105 A1 | 9/2009 |
|----|----|----|
| GB | 2359916 A | 9/2001 |
| GB | 2428329 A | 1/2007 |
| JP | 2008005288 A | 1/2008 |
| WO | WO-00/59224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009/137919 A1 | 11/2009 |

OTHER PUBLICATIONS

Archos Gen 5 English User Manual Version 3.0, Jul. 26, 2007, pp. 1-81.
Barlett, Mitch, "iTunes 11: How to Queue Next Song," Technipages, Oct. 6, 2008, pp. 1-8, retrieved on Dec. 26, 2013 from the internet http://www.technipages.com/itunes-queue-next-song.html.
Gregor Miller et al. "MiniDiver: A Novel Mobile Media Playback Interface for Rich Video Content on an iPhoneTM", Entertainment Computing A ICEC 2009, Sep. 3, 2009, pp. 98-109.
International Search Report for International Patent Application PCT/IL2012/000080 dated Aug. 9, 2012 (4 pages).
International Search Report for International Patent Application PCT/IL2012/000081 dated Jun. 28, 2012 (4 pages).
International Search Report for International Patent Application PCT/IL2010/000362 dated Aug. 25, 2010 (2 pages).
International Search Report and Written Opinion for International Patent Application PCT/IB2013/001000 mailed Jul. 31, 2013, (12 pages).
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, pp. 1-8.
Sodagar, I., (2011) "The MPEG-DASH Standard for Multimedia Streaming Over the Internet", IEEE Multimedia, IEEE Service Center, New York, NY US, vol. 18, No. 4, pp. 62-67.
Supplemental European Search Report for EP10774637.2 (PCT/IL2010/000362) mailed Jun. 20, 2012 (6 pages).
Supplemental European Search Report for EP13184145 dated Jan. 30, 2014 (6 pages).
Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).

* cited by examiner

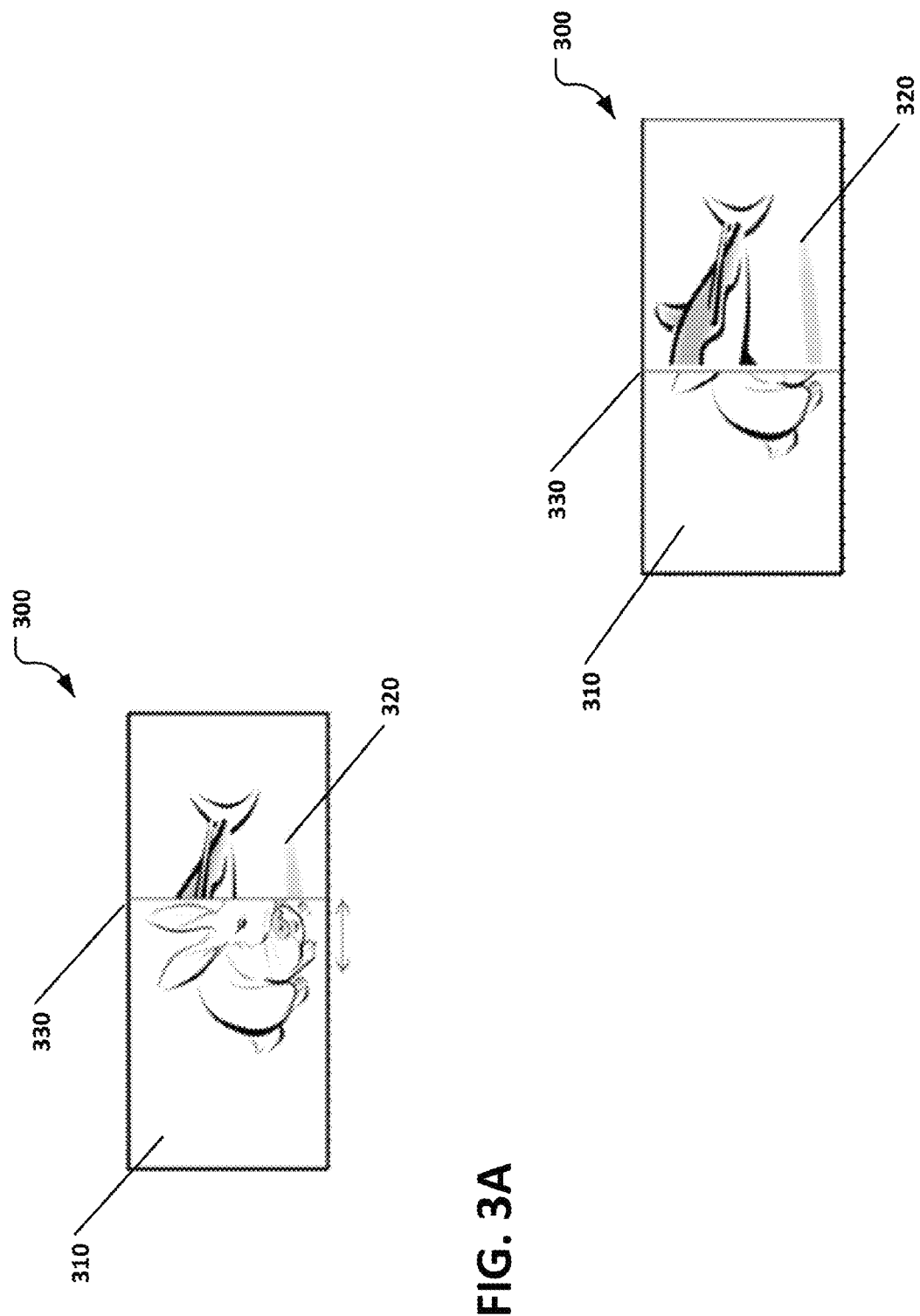

SYSTEMS AND METHODS FOR REAL-TIME PIXEL SWITCHING

CROSS-REFERENCE TO RELATED APPLICATION

This application claims priority to and the benefit of U.S. Provisional Patent Application No. 61/889,304, filed on Oct. 10, 2013, and entitled "Systems and Methods for Real-Time Pixel Switching," the entirety of which is incorporated by reference herein.

FIELD OF THE INVENTION

The present disclosure relates generally to video playback and, more particularly, to systems and methods for dynamically altering portions of a video in real-time during presentation of the video.

BACKGROUND

Over the past decade there has been exponential growth in the prevalence of streaming media. Users increasingly view television shows, movies, and video clips through websites and video streaming services such as Hulu, Netflix, and YouTube. Interactive forms of streaming media are also available. For example, some videos allow a user to affect video playback in real time by interactively selecting a sequence of video segments to play. These interactive videos do not, however, enable the user to alter only a portion of a video frame. Rather, the user is only able to change the contents of the video by causing a different video segment to be played. Consequently, there exists a need for systems and methods for interacting with and altering video frame portions in real-time.

SUMMARY

Systems and accompanying methods are provided for real-time pixel switching in video. In one aspect, a video having first and second portions is provided and is presented to a user, with the first video portion being initially visible to the user and the second video portion not initially visible to the user. During presentation of the video, a user interaction with the first video portion is received, and a selected region of the second video portion is identified based thereon, where the selected region defines a subset of pixels from the second video portion. The selected region is then overlaid on the first video portion, and playback of the second video portion and the first video portion is synchronized. Other embodiments of this aspect include corresponding systems and computer programs.

The first and second video portions can be separate frame areas on a single video, and/or can be separate video files. The second video portion can be played simultaneously with the first video portion, even while some or all of the second video portion is not visible to the user. Overlaying the pixels from the selected region can be performed in real-time during presentation of the video and immediately following the user interaction. Further, presentation of the first video portion and the selected region can continue without interruption immediately following the user interaction.

In one implementation, the selected region includes a subset of pixels from each of a plurality of frames of the second video portion and, to overlay the selected region, each subset of pixels is displayed on a corresponding frame of the first video portion. More specifically, the overlaying can be performed by copying a particular subset of pixels to a layer disposed on the first video portion.

In another implementation, a plurality of video portions not visible to the user are provided. A user interface element for manipulating presentation of the first and second video portions can also be provided. For example, the user interface element can be a slider bar disposed on the video and, on receiving a positioning of the slider bar, part of the first video portion and part of the second video portion is displayed based on the position of the slider bar. As another example, the user interface element is a moveable window disposed on the video and, upon positioning the window, the selected region is display in the moveable window.

In a further implementation, user actions received during the presentation of the video are saved for later recreation of a customized version of the video. Audio playback associated with the video can also be changed during presentation of the video based on the user interaction.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

FIGS. 3A and 3B depict an example pixel switching operation on the video of FIGS. 2A and 2B using an interface control.

DETAILED DESCRIPTION

Systems and methods are described for providing an interface through which a user can interact with a video while it is playing, thereby causing all or a portion of the video content to change in real-time. The change can be seamless, such that the alterations occur either substantially simultaneously with the user's interactions or immediately thereafter, without gaps, pauses, buffering, or other noticeable delays.

Figure 1:
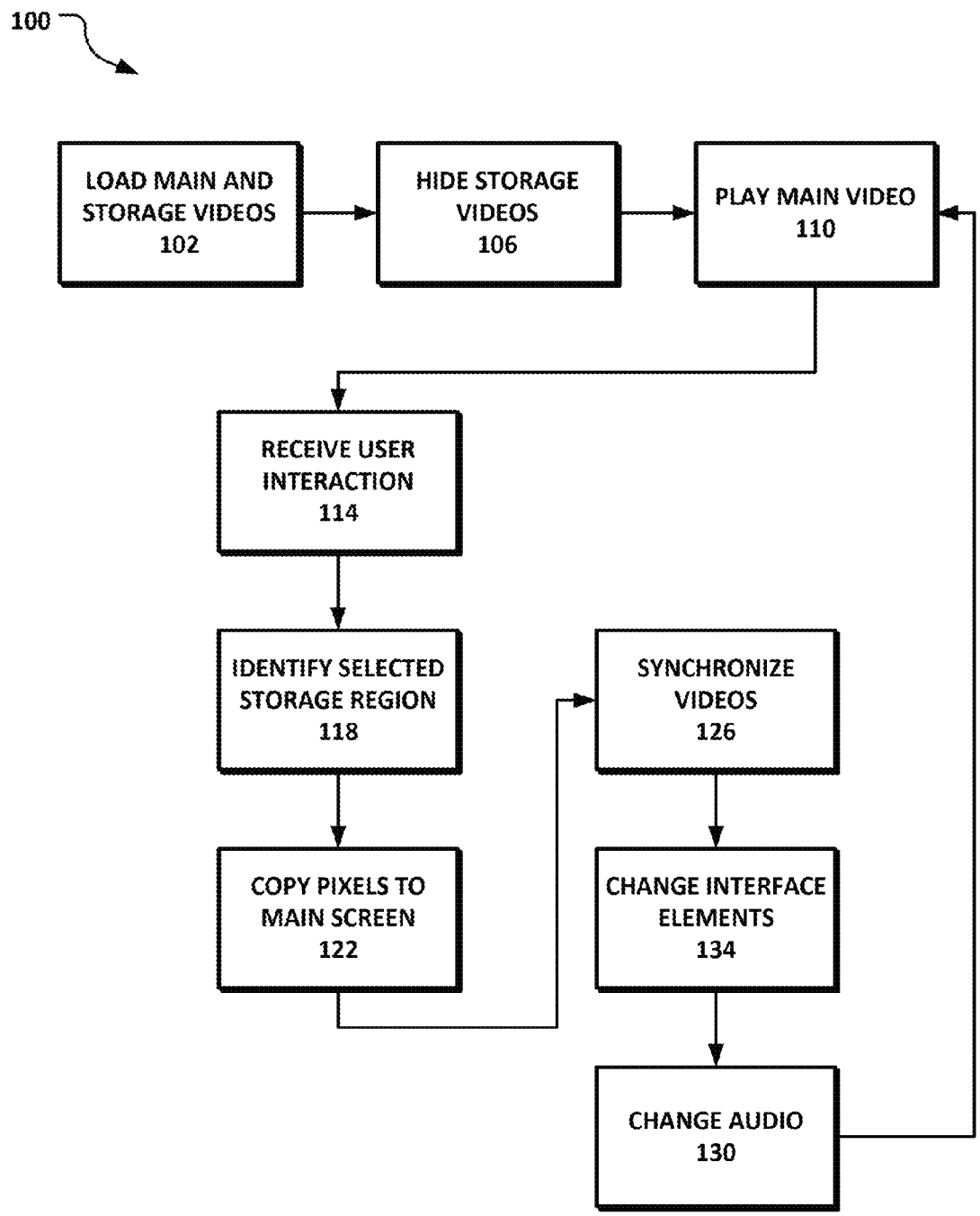
FIG. 1 is a flowchart depicting a method for performing real-time pixel switching according to an implementation.

FIG. 1 depicts an example method 100 for real-time pixel switching. In STEP 102, a video that includes a main screen video (first video portion) and at least one storage screen video (second video portion(s)) is loaded by a video player. The main video screen includes the primary display video to be presented to a viewer, and each storage screen video includes alternative video that can be copied to a layer on the main screen video. Together, the videos can be provided in one or more streams and be synchronized to each other. In one implementation, one or more of the storage screen videos are hidden such that they are not initially visible to a user upon playing the video (STEP 106). In STEP 110, playback of the main screen video is commenced, either automatically or at the user's direction.

In STEP 114, a user interaction with the video is received. The user interaction can be, for example, a touchscreen gesture (e.g., tap, swipe, pinch), mouse gesture (e.g., click, double-click, click-and-drag, mouse motion), a tracked freehand gesture, a voice command, an tracked eye movement, or other suitable input. The interaction can be with the main screen video (or portion thereof), a storage screen video (or portion thereof), and/or a control on the video player. Video player controls can include options to change portions of the video, as described herein, as well as standard playback controls that can affect the main screen and/or storage screen videos, such as play, pause, stop, volume, and expand to full screen.

In one implementation, the received user interaction is directed to a portion of the main screen video (e.g., the user clicks the shirt of a person in the video in order to change the color). In STEP 118, based on the user interaction, a particular selected region of a storage screen video is identified (e.g., a region that includes video of the shirt in a different color). Then, for one or more frames of the main screen video going forward, the subset of pixels that make up the selected region in each corresponding frame of the storage screen video are copied to a layer on the main screen video (STEP 122). In the foregoing shirt example, this can make it appear as if the shirt color in the video changes substantially simultaneously with the user's action.

In other implementations, the selected region of the storage screen video is identified based on an automatic selection made by the video player. The automatic selection can be based on a default choice, a random choice, a predefined choice, popularity (e.g., what other users have chosen, what the user's social connections have chosen), timing (e.g., a selection is made after a fixed or variable amount of time), context (e.g., geographical location, weather, time, age range), and so on.

The main screen and storage screen videos can be synchronized (STEP 126). In one implementation, synchronization is achieved by ensuring that the correct frames of the storage screen video are used in the pixel copying process. For example, if video of a purple shirt from the storage screen video is to be overlaid onto a white shirt in the main screen video, the starting frame of the storage screen video should correspond with the first altered frame of the main screen video, so that the purple shirt pixels are correctly displayed on top of the white shirt pixels for each frame.

It should be noted that the storage screen video can include a plurality of corresponding video frames; thus, secondary video is effectively overlaid onto the primary video. Because the storage screen video can include objects in motion or otherwise changing, the selected region can change among frames of the storage screen video in order to encompass the appropriate pixels to be copied to corresponding frames of the main screen video. Further, the selected region of the storage screen video can be overlaid on the main screen video until, for example, either video portion ends, or a second user interaction is received that removes the overlay or otherwise alters video playback. The pixels in the selected region can be copied to the main screen layer immediately before the corresponding main screen video frame is displayed, or can be copied further in advance (e.g., the selected region pixels for the next 10 frames are copied, the next 30 frames, the next 100 frames, the next second of frames, the next 3 seconds of frames, all remaining frames, etc.).

In some implementations, audio associated with the video playback can be changed to correspond with a change in video (STEP 130). For example, upon overlaying video from the storage screen onto the main screen video, sounds effects associated with an overlaid object can be played, or a transition in music can occur. Likewise, user interface elements (e.g., visual indicators, buttons, timers, controls, and other graphical and/or textual elements) associated with the video and/or video player can also be altered according to a change in video or other action taken by a user (STEP 134). The foregoing steps following receipt of a user interaction can be performed while the video is playing, allowing for a substantially instantaneous change in the video responsive to the user interaction. Accordingly, after receiving a user interaction and performing one or more of the aforementioned steps, the video can continue to play (return to STEP 110) in an uninterrupted fashion, with storage pixels continuing to be copied to the main screen layer as appropriate.

Figure 2A:
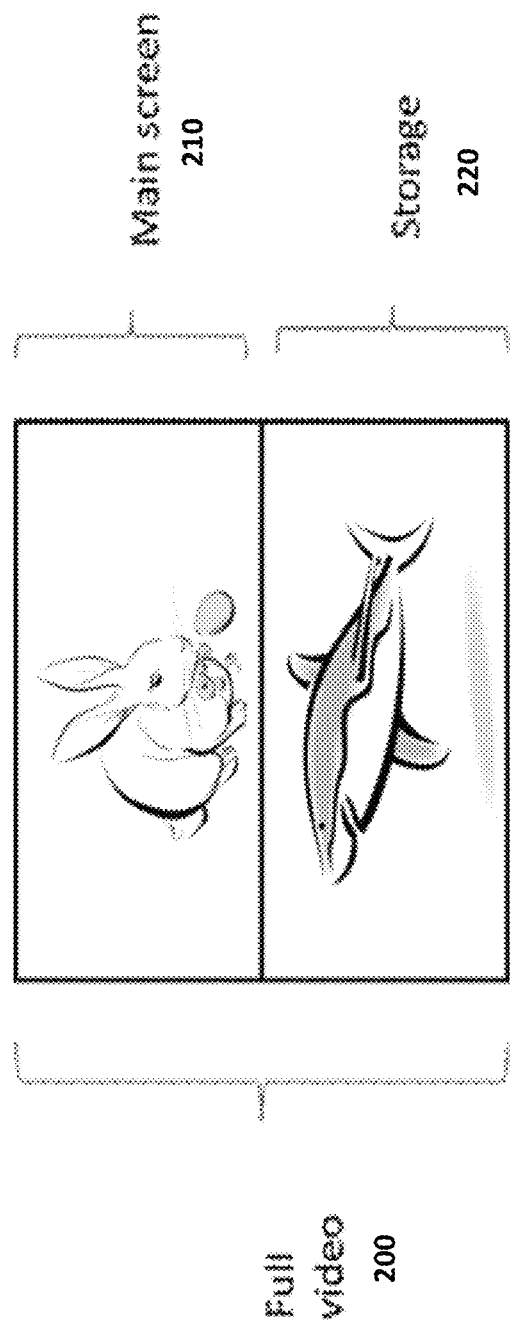
FIG. 2A depicts an example video having a main screen portion and a storage screen portion.
Figure 2B:
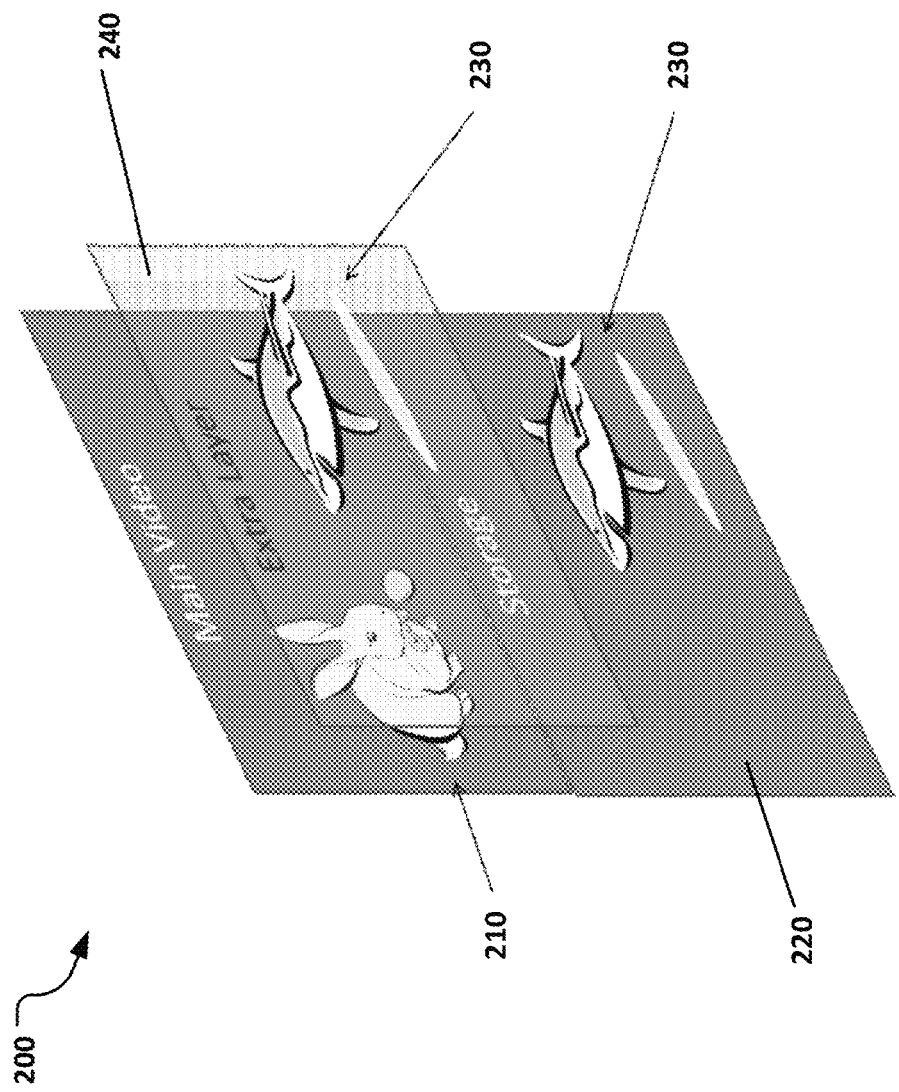
FIG. 2B depicts an example pixel overlay using the video of FIG. 2A.

Referring now to FIGS. 2A and 2B, in one implementation, a video 200 has a total area that is twice the area presented to a user at any point in time (in this example, the main and storage screens video portions 210, 220 are of equivalent area). The main screen video 210 can be shown to the user at all times (although it may not be entirely visible at all times), and a storage area 220 holds video that the user can cause to be displayed, in whole or in part, using a video player interface. Upon receiving an interaction from a user, a portion 230 of the storage video 220 is copied to a layer 240 overlaid on the main screen 210 according to the location of the interaction. If the main screen video 210 and storage screen video 220 are separate areas of the same video, the pixels in the portion 230 can be copied to the main screen 210 for one or more frames of the video 200. If the main screen video 210 and storage video 220 are separate files, the pixels in the portion 230 can be copied for one or more frames of the storage video 220 to corresponding frames of the main screen video 210. The user is then able to see part of the main screen video 210 and the portion 230 of the storage video 220. In some implementations, both the main screen video portion 210 and the storage area video portion 220 are playing and synchronized at all times, whether or not some or all of the storage video 220 is visible.

In one example, as shown in FIG. 2B, the main screen portion 210 of the video 200 includes video of a rabbit, and the storage screen portion 220 includes video of a shark. The storage screen portion 220 is initially hidden to the user. Upon receiving a user interaction (e.g., the user clicks on an empty area in the main screen portion 210), a region of pixels in the storage portion 220 representing the video of the shark is copied to a layer 240 on the main screen portion 210. As noted above, the region of pixels can be copied to the main screen portion 210 for one or more frames of the video 200. The layer 240 can otherwise be transparent, allowing the user to see through to the main screen portion 210 in areas where nothing has been overlaid. Thus, the video of the shark can be displayed with the video of the rabbit immediately after the user interaction occurs, and the video 200 can continue to play with both the rabbit and shark visible to the user. Advantageously, this allows for a level of interactivity in the video 200 that does not require the video player to load an entirely new video (i.e., a separate video of the rabbit and shark together is not needed).

As shown in FIGS. 3A and 3B, in another implementation, the video player interface allows the user to interact with a video 300 using a slider bar 330 and/or other user interface control. For example, by sliding the bar 330 to the left and right the video 300 can seamlessly switch in real-time between two synchronized, currently-playing videos (i.e., displaying the rabbit video 310, the shark video 320, or portions of both simultaneously). More specifically, by moving the slider bar 330 to the right, as shown in FIG. 3A, more of the rabbit video 310 and less of the shark video 320 is shown. Further, by moving the slider bar 330 to the left, as shown in FIG. 3B, more of the shark video 320 and less of the rabbit video 310 is shown. The shark video 320 can be all or a portion of a storage screen that is copied for one or more frames of the video 300 to a layer on the rabbit video 310 (main screen) depending on the position of the slider bar 330. The rabbit and shark videos 310, 320 can be separate video files or separate areas of a single video, such as described above with respect to FIG. 2A. In other implementations, the slider can move in a vertical, diagonal, or other direction. There can also be multiple sliders that allow the user to adjust the display of two or more videos (e.g., one main screen video portion and multiple storage screen video portions).

In some implementations, audio is also responsive to user interactions. In the slider bar example above, there can be multiple audio channels (e.g., stereo), one corresponding to audio for the rabbit video 310 on the left and another corresponding to audio for the shark video 320 on the right. The volume level of each channel (side) can be changed according to the ratio between the two sides of the video 300, based on the position of the slider bar 330. If the slider bar 330 is centered, then the audio volume levels can divided evenly between the left and right channels. Moving the slider bar 330 to expose more of the shark video 320 can result in audio corresponding to that video 320 to increase in volume relative to audio associated with the rabbit video 310. In other implementations, the introduction of a video portion from storage results in new audio being played (e.g., foreboding music upon the display of the shark).

Figure 4:
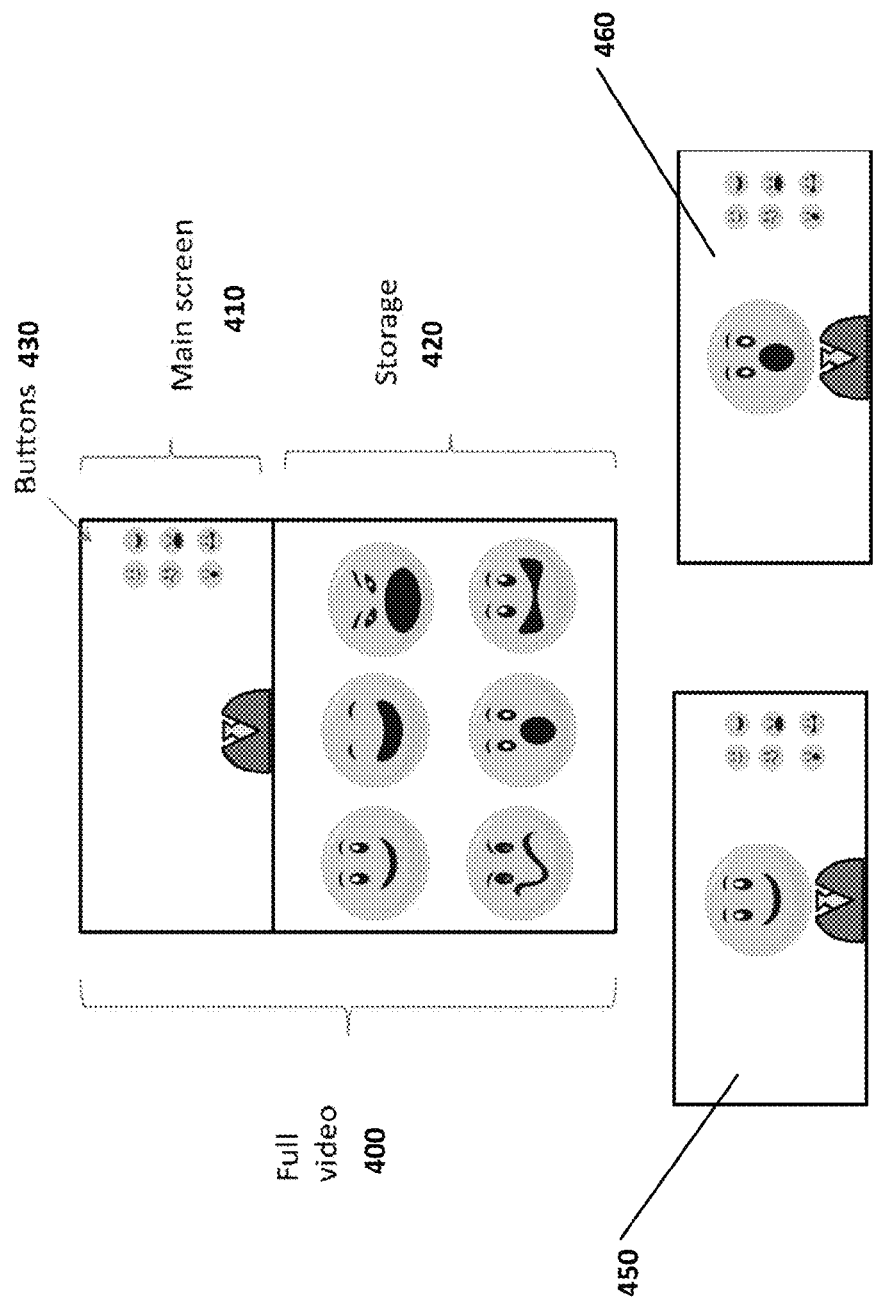
FIG. 4 depicts an example video having a main screen portion and a storage screen portion with multiple selection region options.

In other implementations, the main screen video portion and storage screen video portion do not have an equivalent area (whether as part of the same video file or separate video files). For example, as shown in FIG. 4, the storage area video 420 can have a larger area than the main screen video 410. Here, the main screen video portion 410 includes the body of a character, and a user can choose among different faces for the character by interacting with corresponding graphical interface buttons 430. In some instances, depending on the face currently displayed for the character, different audio (e.g., a unique voice) can be played.

The selection of a particular face (whether automatically or by a user using the various option buttons 430 shown on the playing video 400) can result, substantially instantaneously after the selection, in the pixel region for the corresponding face in the storage video portion 420 being copied to a layer over the main video portion 410, thereby creating a video display that shows the body from the main video portion 410 and the selected face from the storage video portion 420. Notably, the user can select a face in real-time as the video is playing, and the face can be presented immediately after the user's selection. The presentation of the face can be seamless, such that no noticeable delays or gaps in the video result from the change. The pixel region for the face can be copied to the layer over the main video portion 410 for multiple frames of the video 400, thereby creating a seamless video overlay.

In one example based on the video 400 shown in FIG. 4, an animated character relates a story to a user via a video player within a web browser or as a native application on a smartphone, tablet, computer, or other device. A different voice is heard telling the story depending on which face the user selects. The user can select a different face at any time during playback of the video 400, until the story is completed. The ability of the user to change faces and voices over the course of the video 400 creates a vast number of possible permutations, and the user can save the interactions made during presentation of the video 400 for future playback and/or real-time recreation of a customized, interactive or non-interactive video.

Figure 5:
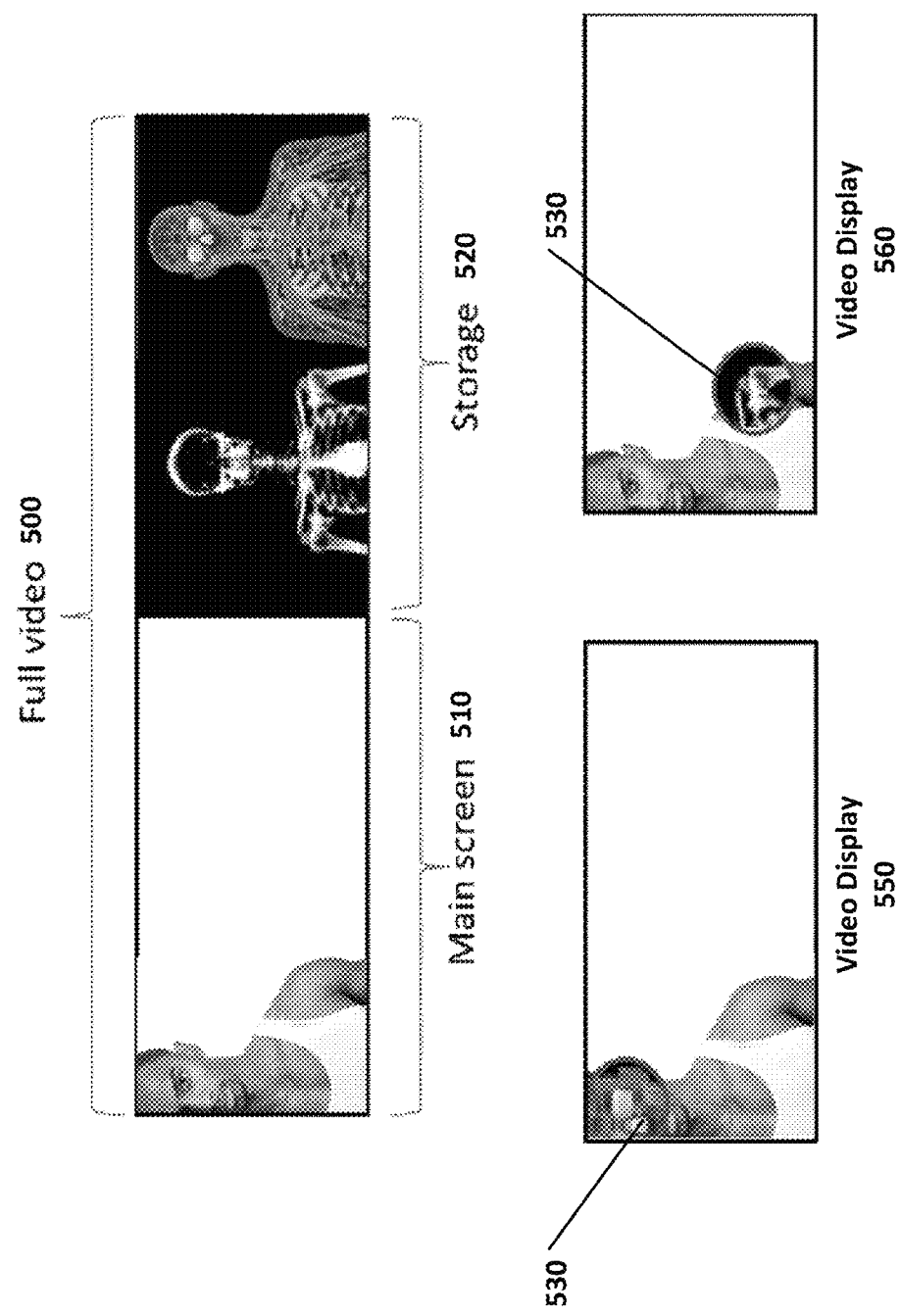
FIG. 5 depicts an example video having a main screen portion and a storage screen portion and a moveable window overlay.

In one implementation, as illustrated in FIG. 5, a video 500 includes a main screen video portion 510 with video of a human in motion and a storage video portion 520 with corresponding animated anatomy of the human (here, an x-ray of the skeletal structure (left), and a more detailed scan including skeletal, organ, and vessel structure (right)). The internal anatomy of the human can be explored by moving an area selection window 530 over the human using an input device (e.g., touchscreen, mouse, motion tracker, etc.). Based on the location of the area selection window 530 on the main screen video portion 510, the corresponding internal anatomy video region from storage 520 is overlaid onto a layer over the main screen 510. For example, the x-ray video can be shown within the selection window 530 (as in video display 550), or the detailed anatomy video can be shown within the selection window 530 (as in video display 560). The selection window 530 can be moveable by a user while the video is playing; thus, the internal anatomy of the human can be shown in real-time by overlaying the synchronized anatomy video pixel region from storage 520 on the main screen 510, while the video 500 is playing, for one or more frames of the video 500.

The main screen video portion 510 and storage portion(s) 520 can be separate areas of the same video, separate video files, or a combination of both. If separate video files, the portions 510, 520 can be synchronized in playback (i.e., the storage portion video 520 plays when the main screen video 510 plays, even if no region from the storage 520 has been copied to the main screen layer or is otherwise visible). In other instances, video regions from the storage area 520 are not played unless visible (e.g., copied onto the main screen video portion 510). If the main video and one or more storage video portions are separate areas of a single video, the storage portion(s) can be disposed in any location relative to the main video portion (e.g., above, under, left, right, inside, etc.).

In some implementations, audio played in conjunction with the video 500 can be responsive to the location of the area selection window 530. For example, a heartbeat sound can be played while the selection window 530 is positioned over the heart, whereas a gurgling sound can be played while the selection window 530 is positioned over the stomach. The sounds can vary in volume as the selection window 530 varies in distance from a particular anatomical region.

One skilled in the art will appreciate the numerous uses and situations in which the techniques described herein can be incorporated. As just a few examples, a commercial for a coffee shop can be shown during which a viewer can change in real-time the coffee machine that a barista is working on; a dance instruction video can allow a viewer to change the partner of the instructor or the location where the lesson occurs; and a bedtime story video can let the viewer change the monster hiding under a child's bed.

In some implementations, the pixel-switching techniques described herein are usable with interactive branched video. For example, a video tree can be formed by nodes that are connected in a branching form. Nodes can have an associated video segment, audio segment, graphical user interface elements, and/or other associated media. Users (e.g., viewers) can watch a video that begins from a starting node in the tree and proceeds along connected nodes. Upon reaching a point where multiple video segments branch off from a currently viewed segment, the user can interactively select the branch to traverse and, thus, the next video segment to watch. Branched video can include seamlessly assembled and selectably presentable multimedia content such as that described in U.S. patent application Ser. No. 13/033,916, filed on Feb. 24, 2011, and entitled "System and Method for Seamless Multimedia Assembly," and U.S. patent application Ser. No. 14/107,600, filed on Dec. 16, 2013, and entitled "Methods and Systems for Unfolding Video Pre-Roll," the entireties of which are hereby incorporated by reference.

The prerecorded video segments in a video tree can be selectably presentable multimedia content and can include, for example, one or more predefined, separate multimedia content segments that are combined to create a continuous, seamless presentation such that there are no noticeable gaps, jumps, freezes, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content in a video tree. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the segment itself.

If a user does not make a selection at a decision point or during a decision period, a default or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments form a seamless multimedia content path, and there can be multiple paths that a user can take to experience a complete, start-to-finish, seamless presentation. Further, one or more multimedia segments can be shared among intertwining paths while still ensuring a seamless transition from a previous segment and to the next segment. The content paths can be predefined, with fixed sets of possible transitions in order to ensure seamless transitions among segments. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. The display can hover and then disappear when the decision period ends or when an option has been selected. Further, a countdown or other visual, aural, or other sensory indicator can be presented during playback of content segment to inform the user of the point by which he must make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

The segment that is played after a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video can continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

During playback of the music video, the pixel-switching techniques described herein can be used to allow a user to change, in real-time, various aspects of the video segments. For example, storage video portions can be provided such that a user can interactively change the instruments played by the musicians, the clothing they wear, scenery, and so on, without requiring separate video files for each possible combination.

Figure 6:
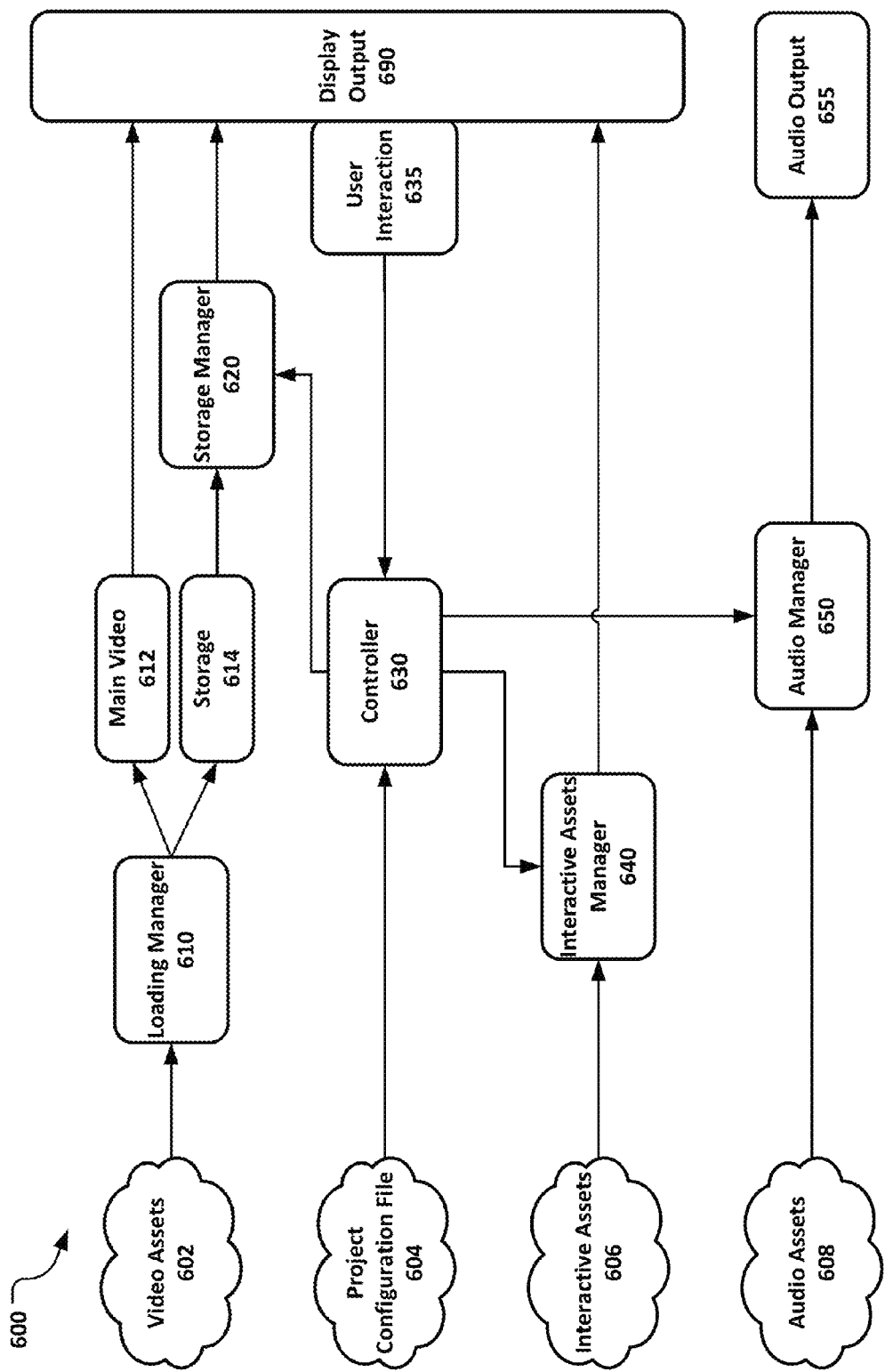
FIG. 6 is a diagram depicting a system for real-time pixel switching according to an implementation.

FIG. 6 depicts one implementation of a system 600 (e.g., a video player) for performing the techniques described herein. A Loading Manager 610 receives as input video assets 602 (e.g., from local storage or remote storage, such as cloud storage) and identifies which video portions correspond to main screen video portions 612 and which correspond to storage video portions 614. Upon playback of a video, the main screen video portion 612 is sent to display output 690. The display output 690 can be, for example, a screen on a smartphone, tablet, desktop computer, laptop, or television. The storage video portions 614 are directed to the Storage Manager 620, further described below.

The system 600 further includes Controller 630, which receives as input a Project Configuration File 604 and, based on thereon in combination with received user interactions 635, determines which instructions to provide to the Storage Manager 620, Interactive Assets Manager 640, and Audio Manager 650. The Project Configuration File 604 defines the particular instructions to provide to the foregoing Managers 620, 640, 650 for each permitted user interaction over the length of a particular video (e.g., if a user clicks on area X of the main screen video 612 between times T1 and T2, load video portion V from storage 614, load sound S from audio assets 608, and load interactive asset I from interactive assets 606).

Based on instructions from the Controller 630, the Storage Manager 620 can retrieve a video region from storage 614 and add the pixels from the region, for each frame, to the layer on the main screen video 612, such that both the main screen video 612 and storage portions are provided to the display output 690. The Controller 630 can also direct the Audio Manager 650 to retrieve audio from audio assets storage 608 and direct the retrieved audio to an audio output 655 (e.g., speakers). The Interactive Assets Manager 640 receives instructions from the Controller 630 as to which interface elements should be retrieved from interactive assets storage 606 and presented to the viewer via display output 690.

The interactive assets 606 can include various graphical and textual interface elements, such as buttons, switches, dials, sliders, spinners, menus, progress bars, dialogs, pop-ups, tabs, links, ribbons, graphical overlays, and the like. The interface elements can be any size or color, and can be positioned anywhere on or around the video display. The elements can be icons, pictures, animations, and/or videos. Text entered by a viewer can appear on the video with various modifications and/or graphical effects. Elements can be rotoscoped onto the video, composited with the video using green screen or other techniques, superimposed, or otherwise overlaid on the video and can include visual effects such as shadowing, embossing, highlighting, distortion, and other desirable effects.

Users can provide interactions 635 with the video player through various input devices, such as desktop computers, laptops, televisions, smartphones, smart glasses, cellular phones, tablets, gaming devices, DVD players, media players, set-top boxes, or other devices having a suitable input interface such as a keyboard, mouse, trackball, touchpad, touchscreen, remote control, eye tracker, motion tracker, microphone, and the like. The video player can present audio and video to users via devices having an audio output 655 and/or display output 690, such as desktop computers, laptops, televisions, smartphones, cellular phones, tablets, smart glasses, gaming devices, DVD players, media players, set-top boxes, and/or any devices having a suitable visual display, audio, and/or other sensory output interface such as a display screen, projector, speaker, and the like. A single device can perform both input and output functions. For example, a smartphone can allow a user to provide input using a touchscreen, while viewing video on the display screen of the phone. Alternatively, a single device can have both input and output capabilities, but may be used for only input or output. For example, the smartphone can be used as an input device to interact with a video that is being played on a television.

More generally, the functions provided by the video player can be implemented in any appropriate hardware or software. If implemented as software, the invention can execute on a system capable of running a commercial operating system such as the Microsoft Windows® operating systems, the Apple OS X® operating systems, the Apple iOS® platform, the Google Android™ platform, the Linux® operating system and other variants of UNIX® operating systems, and the like.

Software implementations can execute on such devices as listed above, or other computing device that is operated as a general purpose computer or a special purpose hardware device that can execute the functionality described herein. In particular, such software can be implemented on a general purpose computing device in the form of a computer including a processing unit, a system memory, and a system bus that couples various system components including the system memory to the processing unit.

The described systems can include a plurality of software processing modules stored in a memory and executed on a processor in the manner described herein. The program modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, the devices include a web browser, client software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the client manually requests a web page from the server. Alternatively, the device automatically makes requests with the web browser. Examples of commercially available web browser software are Microsoft® Internet Explorer®, Mozilla® Firefox®, and Apple® Safari®.

In some implementations, the devices include client software. The client software provides functionality to the device that provides for the implementation and execution of the features described herein. The client software can be implemented in various forms, for example, it can be in the form of a web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a "plug-in" to the web browser or to another framework or operating system. Any other suitable client software architecture, including but not limited to widget frameworks and applet technology can also be employed with the client software.

A communications network can connect the devices with one or more servers and/or with each other. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network can carry TCP/IP protocol communications, and HTTP/HTTPS requests made by a web browser, and the connection between the clients and servers can be communicated over such TCP/IP networks. The type of network is not a limitation, however, and any suitable network can be used.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
providing a video comprising a first video portion and a second video portion;
presenting the video to a user, wherein the first video portion is initially visible to the user and the second video portion is not initially visible to the user; and
during presentation of the video:
receiving a user interaction with the first video portion;
identifying a selected region of the second video portion based on the user interaction with the first video portion, the selected region defining a subset of pixels from the second video portion;
overlaying the selected region on the first video portion by copying the subset of pixels to a layer disposed over the first video portion and not copying to the layer pixels from the second video portion that are not in the subset of pixels; and
synchronizing playback of the second video portion and the first video portion.

2. The method of claim 1, wherein:
the video comprises a plurality of frames;
the first video portion comprises a first portion of each frame; and
the second video portion comprises a second portion of each frame.

3. The method of claim 1, wherein:
the video comprises a plurality of video files;
the first video portion comprises a first one of the video files; and
the second video portion comprises a second one of the video files.

4. The method of claim 1, wherein the second video portion is played simultaneously with the first video portion while the second video portion is not visible to the user.

5. The method of claim 1, wherein the overlaying is performed in real-time during presentation of the video and immediately following the user interaction.

6. The method of claim 1, wherein presentation of the first video portion and the selected region continues without interruption immediately following the user interaction.

7. The method of claim 1, wherein the selected region comprises a subset of pixels from each of a plurality of frames of the second video portion, and wherein the overlaying comprises displaying each subset of pixels on a corresponding frame of the first video portion.

8. The method of claim 1, further comprising providing a plurality of video portions not visible to the user.

9. The method of claim 1, further comprising providing a user interface element for manipulating presentation of the first and second video portions.

10. The method of claim 9, wherein:
the user interface element comprises a slider bar disposed on the video;
the user interaction comprises a positioning of the slider bar; and
the overlaying comprises displaying part of the first video portion and part of the second video portion based on the position of the slider bar.

11. The method of claim 9, wherein:
the user interface element comprises a moveable window disposed on the video;
the user interaction comprises a positioning of the window; and
the overlaying comprises displaying the selected region in the moveable window.

12. The method of claim 1, further comprising saving a plurality of user actions received during the presentation of the video for later recreation of a customized version of the video.

13. The method of claim 1, further comprising, during presentation of the video, changing audio playback associated with the video based on the user interaction.

14. A system comprising:
one or more computers programmed to perform operations comprising:
providing a video comprising a first video portion and a second video portion;
presenting the video to a user, wherein the first video portion is initially visible to the user and the second video portion is not initially visible to the user; and
during presentation of the video:
receiving a user interaction with the first video portion;
identifying a selected region of the second video portion based on the user interaction with the first video portion, the selected region defining a subset of pixels from the second video portion;
overlaying the selected region on the first video portion by copying the subset of pixels to a layer disposed over the first video portion and not copying to the layer pixels from the second video portion that are not in the subset of pixels; and
synchronizing playback of the second video portion and the first video portion.

15. The system of claim 14, wherein:
the video comprises a plurality of frames;
the first video portion comprises a first portion of each frame; and
the second video portion comprises a second portion of each frame.

16. The system of claim 14, wherein:
the video comprises a plurality of video files;
the first video portion comprises a first one of the video files; and
the second video portion comprises a second one of the video files.

17. The system of claim 14, wherein the second video portion is played simultaneously with the first video portion while the second video portion is not visible to the user.

18. The system of claim 14, wherein the overlaying is performed in real-time during presentation of the video and immediately following the user interaction.

19. The system of claim 14, wherein presentation of the first video portion and the selected region continues without interruption immediately following the user interaction.

20. The system of claim 14, wherein the selected region comprises a subset of pixels from each of a plurality of frames of the second video portion, and wherein the overlaying comprises displaying each subset of pixels on a corresponding frame of the first video portion.

21. The system of claim 14, further comprising providing a plurality of video portions not visible to the user.

22. The system of claim 14, further comprising providing a user interface element for manipulating presentation of the first and second video portions.

23. The system of claim 22, wherein:
the user interface element comprises a slider bar disposed on the video;
the user interaction comprises a positioning of the slider bar; and
the overlaying comprises displaying part of the first video portion and part of the second video portion based on the position of the slider bar.

24. The system of claim 22, wherein:
the user interface element comprises a moveable window disposed on the video;
the user interaction comprises a positioning of the window; and
the overlaying comprises displaying the selected region in the moveable window.

25. The system of claim 14, further comprising saving a plurality of user actions received during the presentation of the video for later recreation of a customized version of the video.

26. The system of claim 14, further comprising, during presentation of the video, changing audio playback associated with the video based on the user interaction.

* * * * *